9467X
H. Camp.
Printing Press.
No. 4
Patented Mar. 4. 1836
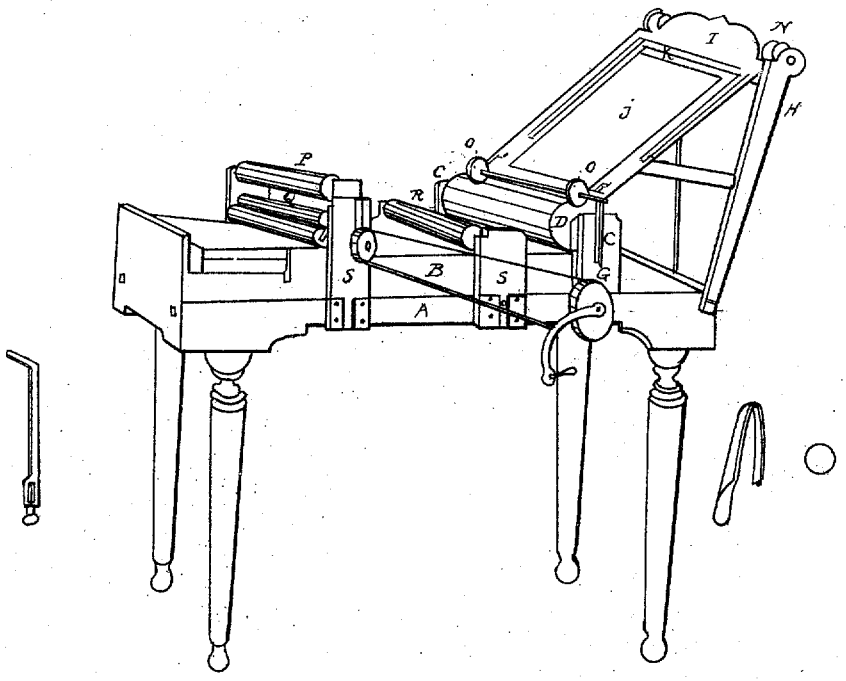

9467X mar 24. 1836  31

Hezekiah Camp.

Letters Patent.

The Schedule referred to in these Letters Patent and making part of the
same, containing a description in the words of the said Hezekiah Camp, in
himself of his improvement in the Printing Press.

To all to whom these presents shall come: be it known that I Hezekiah Camp of
Canton. Tuscarawas County and State of Ohio, have invented a new and useful
improvement in the Printing Press, called Camps, Flexible Impression Press: and
that the following is a full and exact description thereof. First construct
a rectangular frame A of any size desired, and of sufficient height to suit
the convenience of the operator, and support it by four posts. The sides of the
frame to be ploughed or grooved on the top from end to end, to admit of the
rails of the bed B. to be placed thereon. In these grooves are to be inserted
metal bearings or rollers on which the rails of the bed B are to run. Next
construct a moveable bed B, similar to that of the common printing press,
and moved in the same manner, by a crank pully and straps. An additional
pully may be used, and the crank placed to the left hand of the operator in order
to accommodate his habitual motions. In this case the two pullies are to be con:
nected by additional straps. The beds may be made of wood, wrought or
cast iron, Next construct two side plates C. to be fastened to the frame
A about one fourth of the distance of the length of the frame from the right
hand end of said frame one on each side of sufficient size to contain the jour-
nals of the press roller D. and the hooks E. which confine the press roller D.
down to printing point and the spings F which raise the roller and keep it up
whilst the form passes back after the impression is taken. The press roller D
may be made of wood or metal size not material and covered with cloth. The
journals protrude through the side plates C .... playing up and down a fourth
of an inch or more and resting upon the springs F. A metal hook E. is let
into each side plate C. the upper end containing a slot to admit the jour:
nal of the press roller with a sliding box and adjusting screw, the [illegible]

/3 9467X 3-4-1836 end of the hooks being formed in an angle of about 75 degrees and turned
towards the left end of the bed with a circular notch on the inside corner
of the angle to fit a pin or bolt which is to be fastened into the frame A.
which bolts form the journals of the rollers g. immediately under the press roller
D. and on which the bed B. runs, The hooks C connect the journals of the rollers
g. with the journals of the press roller D. and are so adjusted as to confine the
press roller during the operation of printing to the proper point to make the
impression and are fastened at the lower ends by means of pins projecting
out of the sides of the bed B near the left hand end of the bed. These pins when
the bed is carried forward till the impression is fully made, strike the hooks
near the lower end and unfasten them from the bolts or journals of the rollers
and the springs F at the same instant raise the roller D about a fourth of an
inch and sustain it while the bed and form are running back. Near the
other end of the bed are two similar pins, which as the bed returns strike the
hooks on the opposite side and fasten or lock them upon the bolts as before,
thereby bringing the press roller down to printing point. Next construct two
upright pieces H, fastened to the right hand end of the frame A to support
the upper end of the platform i. which is made of wood and placed at an angle
of about 110 degrees to the frame A. the lower end resting upon the upper ends of the side plates
C. said platform must be of sufficient size to accommodate the length and breadth
of the sheet to be printed. Next make a flexible tympan of thin leather, linen
cloth or some other suitable material as large as the sheet to be printed
requires, the lower end of which is to be fastened to the right hand end
of the bed B. the other end of the tympan is brought under the press roller
D. and laid upon the platform i. At the upper end of the tympan attach
clamps k. to hold the upper end of the sheet. They are kept together by a
spring catch and are opened by a point attached to the platform passing
in between them and crowding off the catch. as they come in contact.
Another spring is placed between the clamps to throw them open when
released from the spring catch. near the other end of the tympan are
other clamps to hold the other end of the sheet. they are kept together
by a spring catch at each end and project about one half inch beyond
the sides of the tympan, to admit of wedged formed pieces (which are attached to the platform) to pass in between them remove the spring
catches and force them open as they come in contact with these
pieces. The upper ends of the pieces H. support a shaft I. contain
ing two grooved pullies as far apart as the tympan is wide, and exactly
opposite the upper corners of the tympan. To these corners of said
Tympan are the ends of cords attached the other ends of said cords are
fastened to the pullies - The cords being wound upon these pulies
another pully is attached to one of the outer ends of the same shaft
with a weight suspended from it by means of another cord (so that when
the tympan is carried down in the operation of printing the weight
is drawn up, and when the tympan is permitted to return, the weight
comes down (and being sufficiently heavy) carries the tympan
together with the printed sheet back upon the platform to its original
position. The rollers O, are suspended over the lower end of the platform
by means of a wire shaft attached to the journals of the press roller,
the object of these rollers is to shut the lower clamps. Inking may be
performed in the usual way or by one or more distributing rollers in
the end of the frame on which the bed moves, turned by a strap around
a pully attached to one of the distributers, and around another pully
attached to the main shaft. the inking roller being confined in a
stock is placed upon the distributors and the moving of the bed puts
in motion the rollers by which means the distribution of the ink
is produced. or inking may be performed by a supplying reservoir with
distributers placed in such a position as to ink the type by the motion
of the bed (as represented in the drawing) thus precluding the
necessity of a person to ink. Mode of Operation - place the form
on the bed in the usual manner. Inking may be performed in the
usual manner, or as above described or represented in the draw-
ing. Place the sheet upon the tympan in the usual manner which is
confined at each end and by shutting the clamps. then by turning
the crank the form is forced under the press roller, the tympan
and paper being carried under ~~at the same time~~ the impression is
made and as soon as this is performed the press roller rises up, and

[illegible]

the crank being turned back the form returns, and the tympan and print-
-ed sheet are at the same time carried back upon the platform, and the
clamps fly open leaving the sheet ready to be taken off. What I claim
as my own invention and not previously known in the above de-
scribed machine, is the principle of throwing the press roller in and out
of gear by means of the hooks or otherwise and of the manner of raising
the press roller and keeping it suspended while the form runs back,
thereby preventing the impression from being injured – also a flexible
tympan self opening clamps. and all other necessary apparatus there
to belonging as above described.

Witnesses
[illegible] Sam [illegible]
[illegible] L. S. Beck

Hezekiah Camp (1470 words)

Granted March 4. 1836.

[illegible]